US011495145B2

United States Patent
Iyer et al.

(10) Patent No.: US 11,495,145 B2
(45) Date of Patent: Nov. 8, 2022

(54) METHOD AND SYSTEM FOR SELECTIVELY ENCRYPTING DATASET

(71) Applicant: Wipro Limited, Bangalore (IN)

(72) Inventors: Manjunath Ramachandra Iyer, Bangalore (IN); Sibsambhu Kar, Bangalore (IN); Vinutha Bangalore Narayanamurthy, Bangalore (IN)

(73) Assignee: Wipro Limited, Bangalore (IN)

( * ) Notice: Subject to any disclaimer, the term of this patent is extended or adjusted under 35 U.S.C. 154(b) by 390 days.

(21) Appl. No.: 16/703,001

(22) Filed: Dec. 4, 2019

(65) Prior Publication Data
US 2021/0097894 A1    Apr. 1, 2021

(30) Foreign Application Priority Data
Sep. 27, 2019   (IN) .............................. 201941039260

(51) Int. Cl.
*G09C 1/00*    (2006.01)
*G06N 20/00*   (2019.01)
*H04L 9/00*    (2022.01)

(52) U.S. Cl.
CPC .............. *G09C 1/00* (2013.01); *G06N 20/00* (2019.01); *H04L 9/008* (2013.01)

(58) Field of Classification Search
CPC .......... G09C 1/00; G06N 20/00; G06N 3/084; G06N 3/0454; H04L 9/008
See application file for complete search history.

(56) References Cited

U.S. PATENT DOCUMENTS

| 9,946,970 | B2 | 4/2018 | Gilad-Bachrach et al. |
| 2007/0016768 | A1* | 1/2007 | Sonnekalb .......... G06F 11/1008 713/160 |
| 2016/0210534 | A1* | 7/2016 | Padubrin .................. G06F 17/40 |

FOREIGN PATENT DOCUMENTS

| CN | 108898028 A | 11/2018 |
| CN | 108920981 A | 11/2018 |

OTHER PUBLICATIONS

Puthal Deepak et al. ("SEEN: A Selective Encryption method to ensure confidentiality for big sensing data streams", IEEE transactions on big data, IEEE, vol. 5, No. 3, Sep. 1, 2019 (Sep. 1, 2019), pp. 379-392, XP011742918, DOI:10.1109/TBDATA.2017.27012172.*

(Continued)

*Primary Examiner* — Abiy Getachew
(74) *Attorney, Agent, or Firm* — Finnegan, Henderson, Farabow, Garrett & Dunner, LLP

(57) ABSTRACT

A method and a system of selective encryption of a test dataset is disclosed. In an embodiment, the method may include determining a relevancy grade associated with each of a plurality of datapoints within a test dataset by comparing the test dataset with a common heat map, wherein the common heat map is generated using a plurality of training datasets. The method may further include calculating, based on the relevancy grade, an encryption level associated with each of the plurality of datapoints. The method may further include selectively encrypting at least one datapoint from the plurality of datapoints based on the encryption level associated with each of the plurality of datapoints. The at least one data point is rendered to a user after being decrypted.

17 Claims, 10 Drawing Sheets

(56) References Cited

OTHER PUBLICATIONS

Deepak A. Kaji et al. "An attention based deep learning model of clinical events in the intensive care unit", Plos one, vol. 14,mo. 2,Feb. 13, 2019(Feb. 13, 2019),p. e0211057XP055722351, DOI: 10.1371/journal.pone.0211057.*

Bach, S., et al., "On Pixel-Wise Explanations for Non-Linear Classifier Decisions by Layer-Wise Relevance Propagation", PLOS ONE, vol. 10, No. 7, Jul. 10, 2015. pp. 1-46.

Kaji, D.A., et al., "An attention based deep learning model of clinical events in the intensive care unit", PLOS ONE, vol. 14, No. 2, Feb. 13, 2019. pp. 1-17.

Puthal, D. et al., "SEEN: A Selective Encryption Method to Ensure Confidentiality for Big Sensing Data Streams", IEEE Transactions on Big Data, IEEE, vol. 5, No. 3, Sep. 2019. pp. 379-392.

European Search Report issued in the European Patent Office in counterpart European Application No. 20165245.0 dated Aug. 24, 2020. 9 pages.

Dowlin, N., "CryptoNets: Applying Neural Networks to Encrypted Data with High Throughout and Accuracy", 2016 Proceedings of the 33rd International Conference on Machine Learning, 10 pages.

\* cited by examiner

METHOD AND SYSTEM FOR SELECTIVELY ENCRYPTING DATASET

TECHNICAL FIELD

This disclosure relates generally to encrypting data, and more particularly to a method and system for selectively encrypting a dataset.

BACKGROUND

In recent times, there have been multifarious application of Artificial Intelligence (AI) models, for example, deep learning models. Due to such increased usage and high complexity, these AI models are stored over cloud or in a server. Users may use these stored AI models as a service, so as to perform predefined actions. As it may be appreciated, various deep learning models may be generated, with each model having a different specification in terms of speed, accuracy, false positives, etc. Accordingly, the user can select a model as per his/her requirement to perform predefined actions. User data is processed using the selected model, and results are obtained for further processing.

However, these deep learning models stored over the cloud or in the server are prone to vulnerabilities and security attacks. For example, a hacker may alter weights of the deep learning model, thereby influencing the decisions obtained using the model. Further, feeding user data into the model is risky as this may expose the data to third parties. Moreover, most users do not prefer to store their sensitive data, such as salary details, loan amounts, etc., on the cloud while using the services of the deep learning models. For example, a classifier model (deep learning model) stored on a cloud may be capable of providing a response to a user on whether the user is eligible for a loan or not, based on a required loan amount, previous records of payment, salary details of the user, other outstanding loan amount, age of the user, etc. In this example, financial institutions (banks) are often reluctant to send these personal details of users over the internet to access the model.

Conventionally, a user may send their data to a model over a cloud upon encrypting the data. Accordingly, results obtained from the model need to be decrypted at the user end, using homomorphic encryption techniques. Although, the conventional homomorphic encryption techniques can be used. However, these techniques require complex keys involving complex operations. Moreover, in some cases, stronger keys are used to protect a simple and obvious data. This results in unnecessary computations, and consequently power loss and operational delays.

SUMMARY

In one embodiment, a method of selective encryption of a test dataset is disclosed. The method may include determining a relevancy grade associated with each of a plurality of datapoints within a test dataset by comparing the test dataset with a common heat map. The common heat map is generated using a plurality of training datasets. The method may further include calculating, based on the relevancy grade, an encryption level associated with each of the plurality of datapoints. The method may further include selectively encrypting at least one datapoint from the plurality of datapoints based on the encryption level associated with each of the plurality of datapoints. The at least one data point is rendered to a user after being decrypted.

In another embodiment, an encryption device for selective encryption of a test dataset is disclosed. The encryption device includes a processor and a memory communicatively coupled to the processor. The memory stores processor instructions, which, on execution, may cause the processor to determine a relevancy grade associated with each of a plurality of datapoints within a test dataset by comparing the test dataset with a common heat map. The common heat map is generated using a plurality of training datasets. The processor instructions, on execution, may further cause the processor to calculate, based on the relevancy grade, an encryption level associated with each of the plurality of datapoints. The processor instructions, on execution, may further cause the processor to selectively encrypt at least one datapoint from the plurality of datapoints based on the encryption level associated with each of the plurality of datapoints. The at least one data point is rendered to a user after being decrypted.

In yet another embodiment, a non-transitory computer-readable storage medium is disclosed. The non-transitory computer-readable storage medium has stored thereon, a set of computer-executable instructions causing a computer comprising one or more processors to perform steps including determining a relevancy grade associated with each of a plurality of datapoints within a test dataset by comparing the test dataset with a common heat map, wherein the common heat map is generated using a plurality of training datasets; calculating, based on the relevancy grade, an encryption level associated with each of the plurality of datapoints; and selectively encrypting at least one datapoint from the plurality of datapoints based on the encryption level associated with each of the plurality of datapoints. The at least one data point is rendered to a user after being decrypted.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
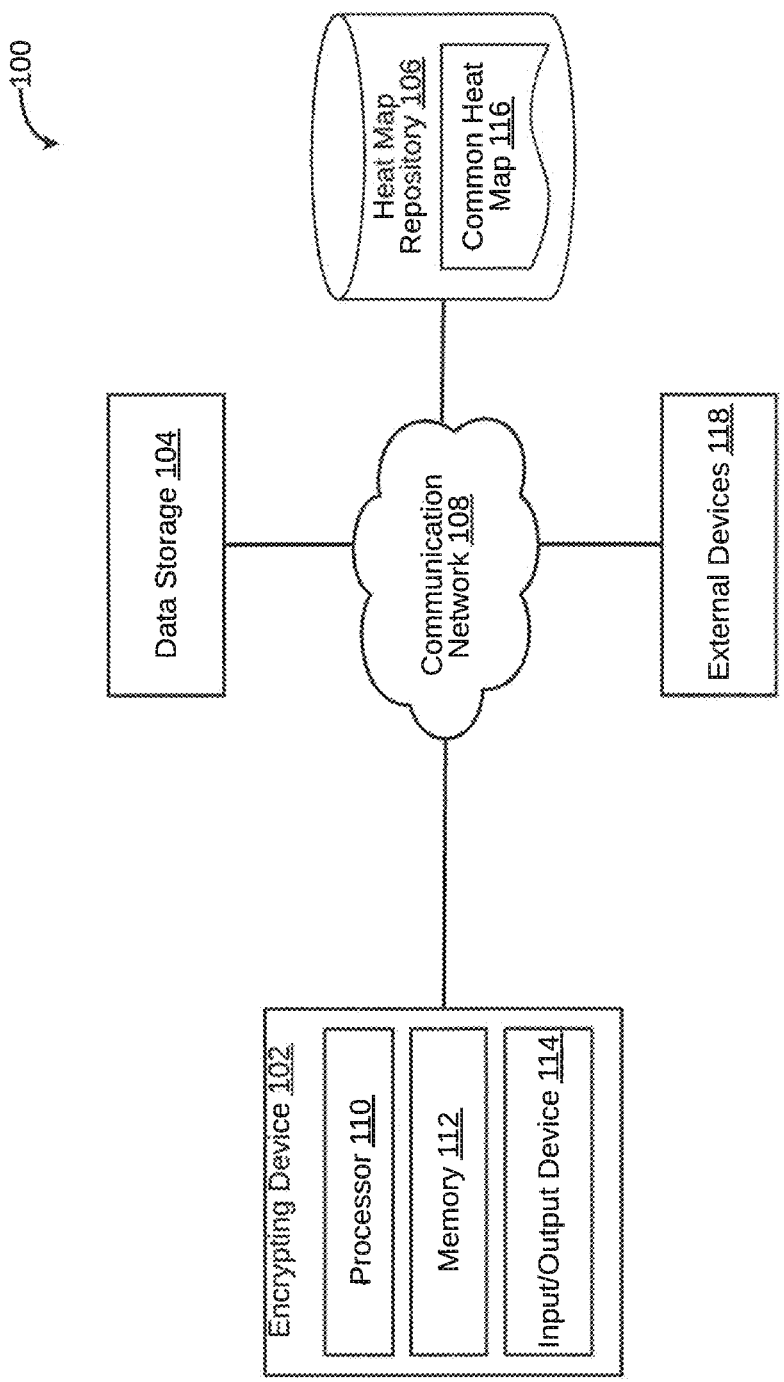
FIG. 1 illustrates a system for selective encryption of a test dataset, in accordance with an embodiment.

In one embodiment, a system 100 for selective encryption of a test dataset is illustrated in the FIG. 1, in accordance with an embodiment. The system 100 may include an encrypting device 102 and a data storage 104. The encrypting device 102 may be a computing device having data processing capability. In particular, the encrypting device 102 may have capability for selectively encrypting a test dataset. Examples of the encrypting device 102 may include, but are not limited to a server, a desktop, a laptop, a notebook, a netbook, a tablet, a smartphone, a mobile phone, an application server, a sever, or the like. The data storage 104 may store a test dataset to be encrypted. The data storage 104 may be communicatively coupled to the encrypting device 102 via a communication network 108. The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

In some embodiments, the encrypting device 102 may selectively encrypt a test dataset, using a common heat map. To this end, the encrypting device 102 may be coupled to a heat map repository 106, via the communication network 108. The heat map repository 106 may store a common heat map 116.

As will be described in greater detail in conjunction with FIG. 2 to FIG. 10, in order to selectively encrypt a test dataset, the encrypting device 102 may determine a relevancy grade associated with each of a plurality of datapoints within a test dataset by comparing the test dataset with the common heat map 116. The common heat map 116 may be generated using a plurality of training datasets. The encrypting device 102 may further calculate an encryption level associated with each of the plurality of datapoints, based on a relevancy grade. The encrypting device 102 may further selectively encrypt at least one datapoint from the plurality of datapoints based on the encryption level associated with each of the plurality of datapoints. The at least one data point may be rendered to a user after being decrypted.

In order to perform the above discussed functionalities, the encrypting device 102 may include a processor 110 and a memory 112. The memory 112 may store instructions that, when executed by the processor 110, cause the processor 110 to selectively encrypt a test dataset, as discussed in greater detail in FIG. 2 to FIG. 10, The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., relevancy grade data, comparison data, encryption level data, classification data, an Artificial Intelligence (AI) model, filter data, heat map data, Layer wise Relevance Propagation (LRP) data, Sensitivity Analysis (SA) data, priority index data, homomorphic encryption key data, encryption scale data, etc.) that may be captured, processed, and/or required by the system 100.

The encrypting device 102 may further include one or more input/output devices 114 through which the encrypting device 102 may interact with a user and vice versa. By way of an example, the input/output device 114 may be used to render a data point to a user after being decrypted. The system 100 may interact with one or more external devices 118 over the communication network 108 for sending or receiving various data. Examples of the one or more external devices 118 may include, but are not limited to a remote server, a digital device, or another computing system.

Figure 2:
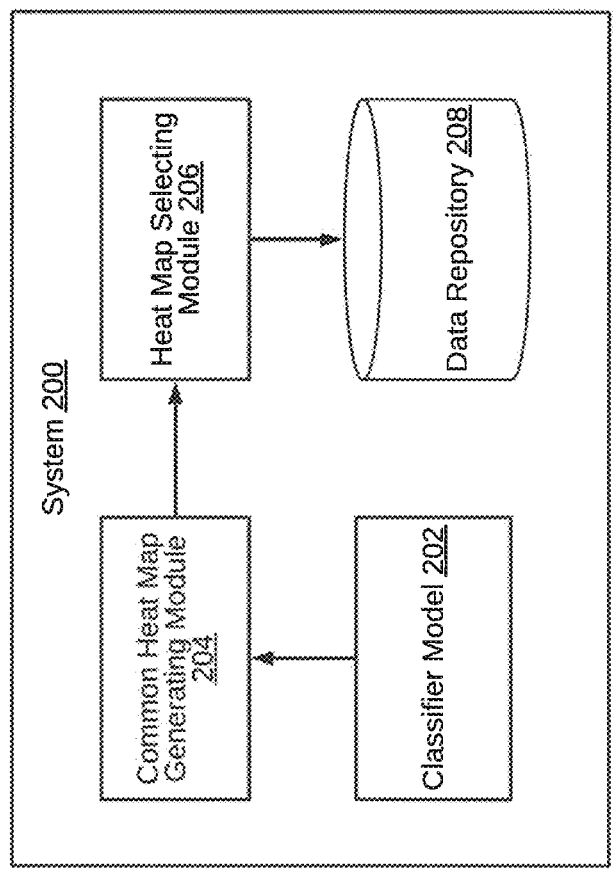
FIG. 2 illustrates a functional block diagram of a system for generating and storing a common heat map, in accordance with an embodiment.

Referring now to FIG. 2, a functional block diagram of a system 200 for generating and storing a common heat map is illustrated, in accordance with an embodiment. The system 200 may include a classifier model 202, a common heat map generating module 204, a heat map selecting module 206, and a data repository 208.

In some embodiments, the classifier model 202 may include an Artificial Intelligence (AI) model. The classifier model 202 may receive a plurality of training datasets. In some embodiments, the plurality of training datasets may include an image data. By way of an example, the image data may include a plurality of training images for generating a common heat map. The training images may be of standard formats, for example, Joint Photographic Experts Group (JPEG), Portable Network Graphics (PNG), and Bitmap (BMP), etc. However, the plurality of training datasets may include, but is not limited to an audio data and/or a multimedia data. The training datasets may be used by the classifier model 202 for extracting the image data.

The common heat map generating module 204 may be configured to receive one or more activations, a classification information, and weight details that are generated by the classifier model 202. The common heat map generating module 204 may be further configured to generate a plurality of heat maps for the plurality of training datasets, based on relevance of the neurons and eventually input pixels. It may be noted that the common heat map may be generated by taking an average a plurality of heat maps related to the plurality of training datasets. To this end, the common heat map generating module 204 may be configured to take an average of the plurality of generated heat maps over multiple classes, by assigning weightages proportional to a degree of overlaps, to generate the common heat map. The common heat map generating module 204 may send the generated common heat map to the heat map selecting module 206.

Upon receiving the common heat map, the heat map selecting module 206 may categorize different regions of each heat map (for each training dataset of the plurality of training datasets) according to their level of importance (or relevance) in the decision making, to generate a prioritized data. It may be understood that different regions in the common heat map have different relevance. The heat map selecting module 206 may then store the prioritized data (i.e., the common heat map where the priorities or relevance of different regions are identified) in the data repository 208. The heat map selecting module 206 may be further configured to assign different regions of the heat map with different priority indices to indicate a relative importance in decision-making. The priority indices may be assigned based on an intensity of different regions of the heat map. The heat maps of different importance may be encrypted with different encryption keys.

The data repository 208 may store the common heat map, the prioritized regions of the common heat map (i.e. prioritized data), and different encryption keys corresponding to the different regions of the heat map. It may be noted that the common heat map may be used for encryption as well as decryption of test datasets. Further, the common heat map may support fast access as type decryption is expected to happen in near real time.

Figure 3:
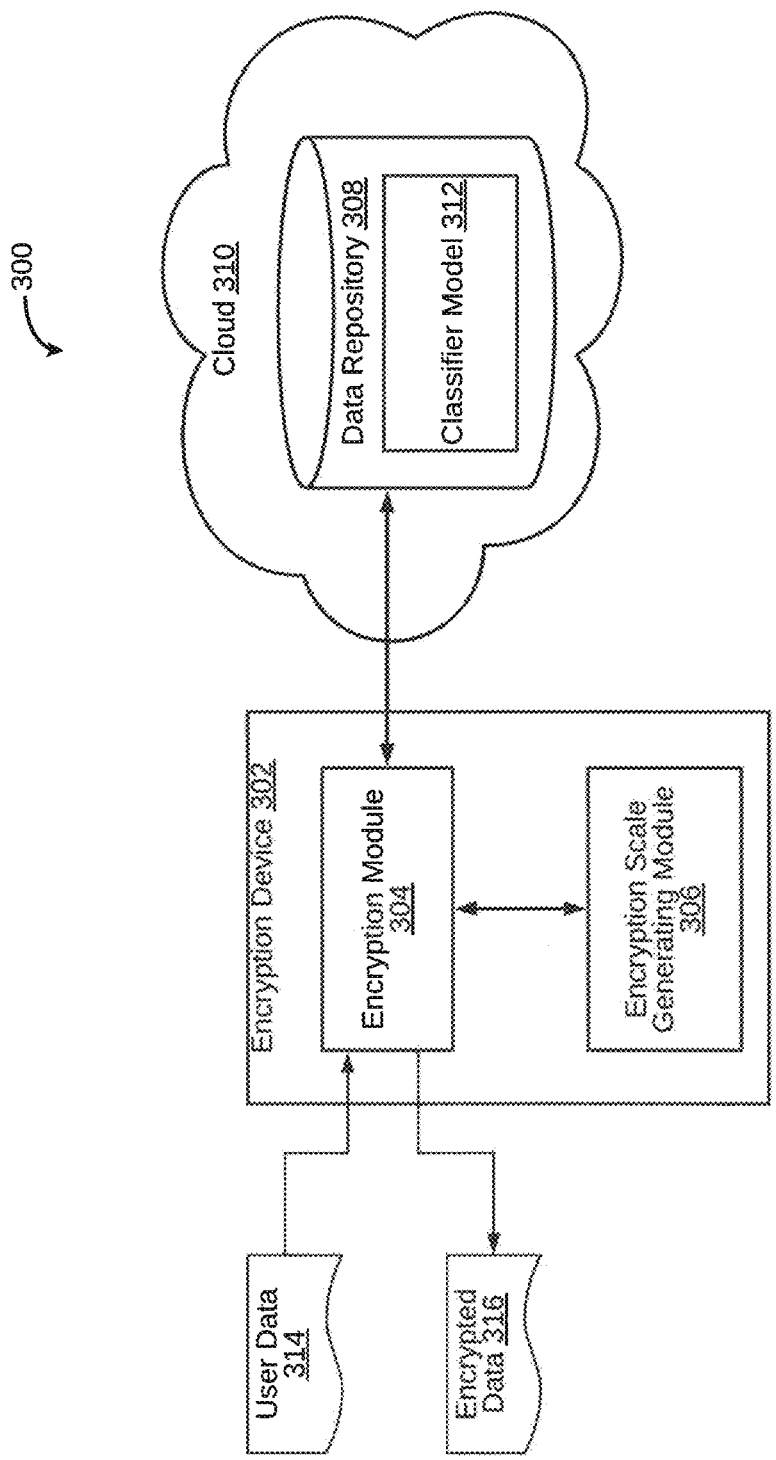
FIG. 3 illustrates a functional block diagram of a system for encrypting content using dynamically generated encryption keys, in accordance with an embodiment.

Referring now to FIG. 3, a functional block diagram of a system 300 for encrypting content using dynamically generated encryption keys is illustrated, in accordance with an embodiment. The encryption keys, for example, may be homomorphic encryption keys. The system 300 may encrypt the content using one or more dynamically generated encryption keys. The system 300 may include an encryption device 302. The encryption device 302 may further include an encryption module 304 and an encryption scale generating module 306. The system 300 may further include a data repository 308 stored on a cloud 310. The data repository 308 may store a classifier model 312 (analogous to the classifier model 202).

The encryption module 304 may receive user data 314. The user data 314 may include one or more images, which are to be classified using the classifier model 312. Upon receiving the user data 314, the encryption module 304 may receive the common heat map and one or more encryption keys with different strengths (for different regions of the image) from the data repository 308. The encryption module 304 may be configured to encrypt different parts of the user data 314 with different encryption keys of different strengths, based on the common heat map. It may be understood that a region, which is more common among the set of classes, may be assigned an encryption key from a plurality of encryption keys such that the strength of the assigned encryption key is greater than a pre-defined strength threshold. The region, which is more common among the set of classes, is indicative of data that is important and sensitive. Considering the importance and sensitivity of such data, it becomes prudent to ensure that the data is encrypted using the strongest encryption key available, so that, the data is protected from being hacked or stolen while being uploaded to the cloud.

The encryption module 304 may encrypt the user data 314 to generate encrypted data 316. The encryption module 304 may be configured to send the encrypted data 316 to the classifier model 312 to identify classification information of the user data 314. The encrypted data 316 may include encrypted user data 314 that is encrypted, for example, with homomorphic encryption technique, using a hierarchy of encryption keys. It may be understood that selection of the encryption keys may be based on the relevance of the data for classification. By way of an example, greater the relevance of the data to the classification, higher would be the strength of the encryption key assigned to the data. Considering the high relevance or significance of such data, it is important to encrypt the data using an encryption key of high strength to avoid data theft. The encryption module 304 may receive the classification information from the data repository 308. The encryption module 304 may send the encrypted data 316 along with the classification information to an external electronic device (not shown in FIG. 3).

The encryption scale generating module 306 may receive the encrypted data 316. Upon receiving the encrypted data 316, the encryption scale generating module 306 may generate an encryption scale. It may be understood that an encrypted data may be inputted in an encrypted model and the encrypted model may generate an encrypted output for the input data, using encrypted weights. In order to convert the encrypted output into a non-encrypted format (i.e. decrypt the encrypted output), the encryption scale may be used. As such, the encryption scale may be indicative of a ratio between weights of an encrypted model. To obtain the encryption scale, at the time of model development, the heat map ratios of a test image spanning a major part of the image regions may be computed with and without encryption. The encryption scale may thus be used to interpret the heat map. The encryption scale generating module 306 may be further configured to send the generated encryption scale to the encryption module 304.

The data repository 308 may store the classifier model 312. The classifier model 312 may be stored on the cloud 310 so that the classifier model 312 is made accessible as a service or online application for a large number of users. Accordingly, a user may select any model based on price, speed requirement, and accuracy depending on the nature of the application, and as per the user preferences. Storing the data repository 308 on the cloud 310 also allows easy maintenance of the classifier model 312, as the maintenance operations can be performed at one place. The data repository 308 may store the common heat map and the keys. The data repository 308 may send the common heat map and the keys to the encryption module 304.

The classifier model 312 may receive the encrypted data from the encryption module 304, to identify the classification information of the encrypted data. Upon identifying the classification information, the classifier model 312 may send the classification information to the encryption module 304.

Figure 4:
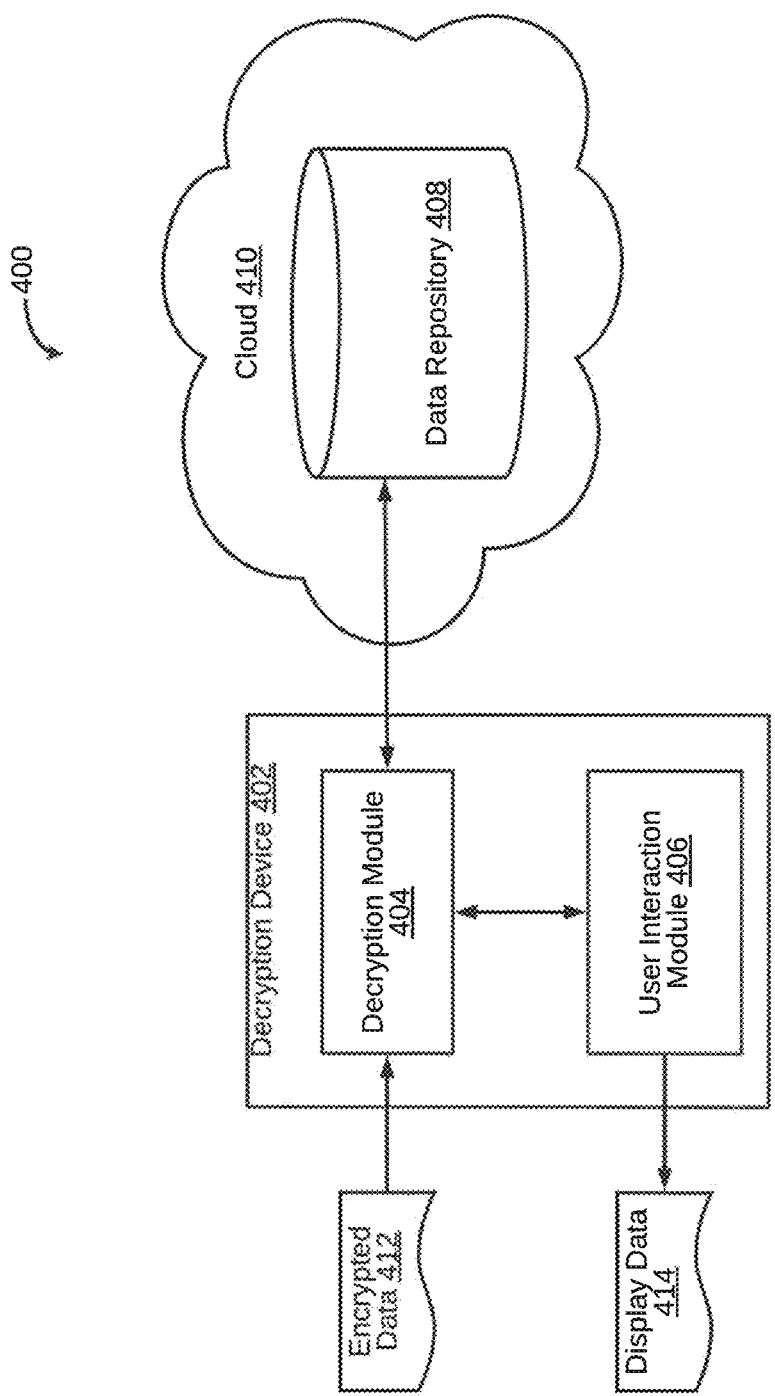
FIG. 4 illustrates a functional block diagram of a system for decrypting encrypted content using dynamically generated encryption keys, in accordance with an embodiment

Referring now to FIG. 4, a functional block diagram of a system 400 for decrypting encrypted content using dynamically generated encryption keys is illustrated, in accordance with an embodiment. The encryption keys, for example, may be homomorphic encryption keys. The system 400 may include a decryption device 402, and a data repository 408 stored on a cloud 410. The decryption device 402 may further include a decryption module 404 and a user interaction module 406.

The decryption module 404 may be configured to receive encrypted data 412, classification information, and a heat map. It may be understood that the encrypted data 412 may be obtained by encrypting user data using homomorphic encryption technique with a hierarchy of keys. The encrypted data 412 may be generated using the encryption keys based on relevance of the data for classification. For example, relevance may be higher for data having greater influence on the classification generated by a classifier model. The encrypted data 412 may be provided as an input to the decryption module 404. The decryption module 404 may be further configured to extract a shuffle table and keys corresponding to the encrypted data 412 from the data repository 408. By using the shuffle table and the encryption keys, the decryption module 404 may decrypt the encrypted data 412 to generate decrypted data. The decrypted data may be rendered to a user as part of display data 414 via a display screen (not shown in FIG. 4)

The user interaction module 406 may receive the decrypted data from the decryption module 404, and may render the decrypted data (as part of the display data 414) to the user via the display screen. The user interaction module 406 may further receive a user input that is to be performed on the display data 414. For example, the user input may include an indication/feedback on correct decryption of the encrypted data 412.

The data repository 408 may store the common heat map, the encryption scale, and the homomorphic encryption keys corresponding to the prioritized parts of the common heat map. The encryption scale and the encryption keys corresponding to the encrypted data may be sent to the decryption module 404.

Figure 5:
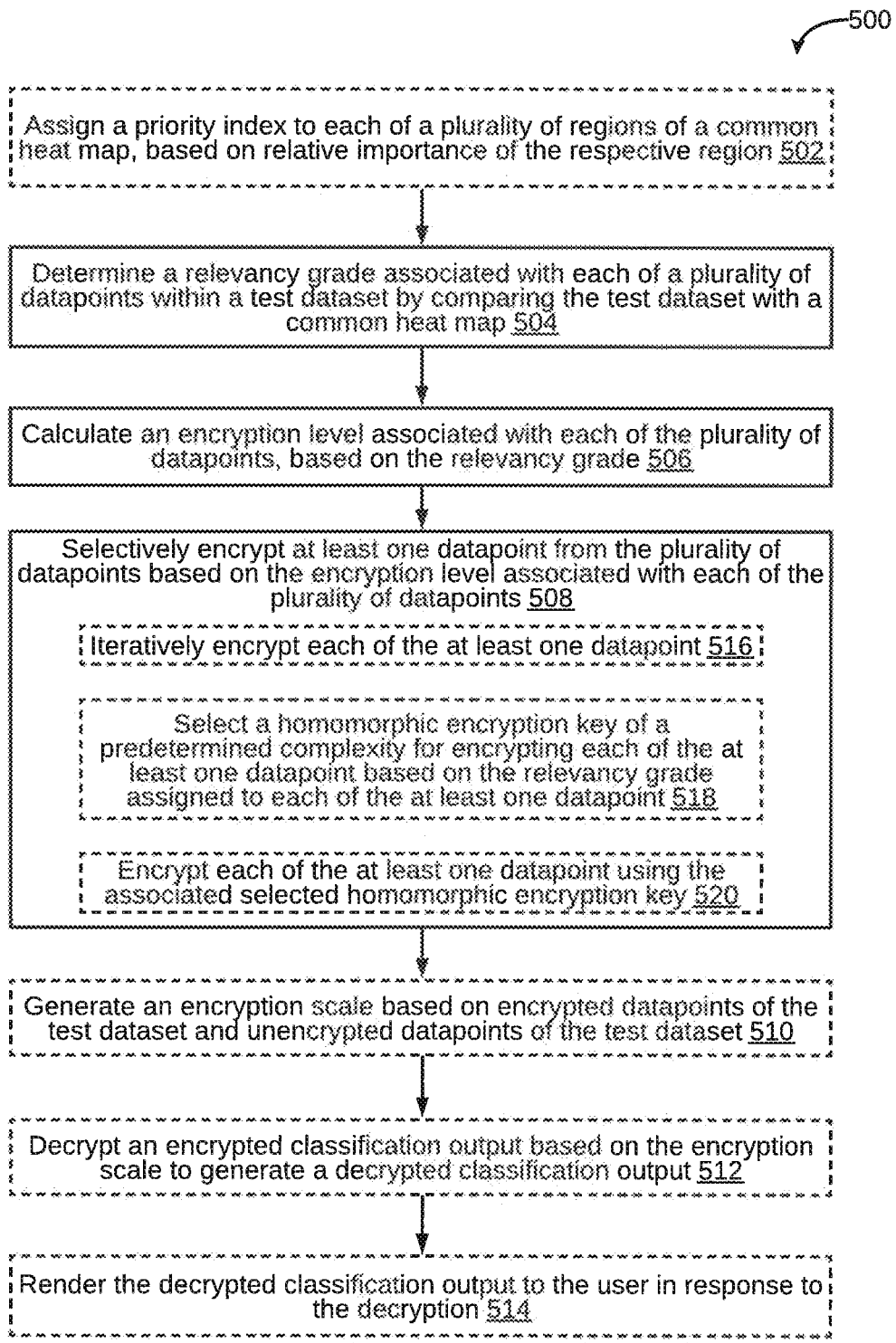
FIG. 5 illustrates a flowchart of a method of selective encryption of a test dataset, in accordance with an embodiment.

Referring now to FIG. 5, a flowchart 500 of a method of selective encryption of a test dataset is illustrated, in accordance with an embodiment. By way of an example, the method may be performed by an encryption device 102. At step 502, a priority index may be assigned to each of a plurality of regions of a common heat map, based on relative importance of the respective region. It may be noted that the common heat map may be generated using a plurality of training datasets. The generating of the common heat map is further explained in conjunction with FIG. 6.

At step 504, a relevancy grade associated with each of a plurality of datapoints within a test dataset may be determined by comparing the test dataset with the common heat map. At step 506, an encryption level associated with each of the plurality of datapoints may be calculated, based on the relevancy grade. At step 508, at least one datapoint from the plurality of datapoints may be selectively encrypted based on the encryption level associated with each of the plurality of datapoints. At step 510, an encryption scale may be generated based on encrypted datapoints of the test dataset and unencrypted datapoints of the test dataset. At step 512, an encrypted classification output may be decrypted based on the encryption scale to generate a decrypted classification output. At step 514, the decrypted classification output may be rendered to the user in response to the decryption.

Referring back to step 502, a priority index may be assigned to each of the plurality of regions of a common heat map, based on relative importance of the respective region. The common heat map may be generated using a plurality of training datasets. The generating of the common heat map is further explained in conjunction with FIG. 6.

Figure 6:
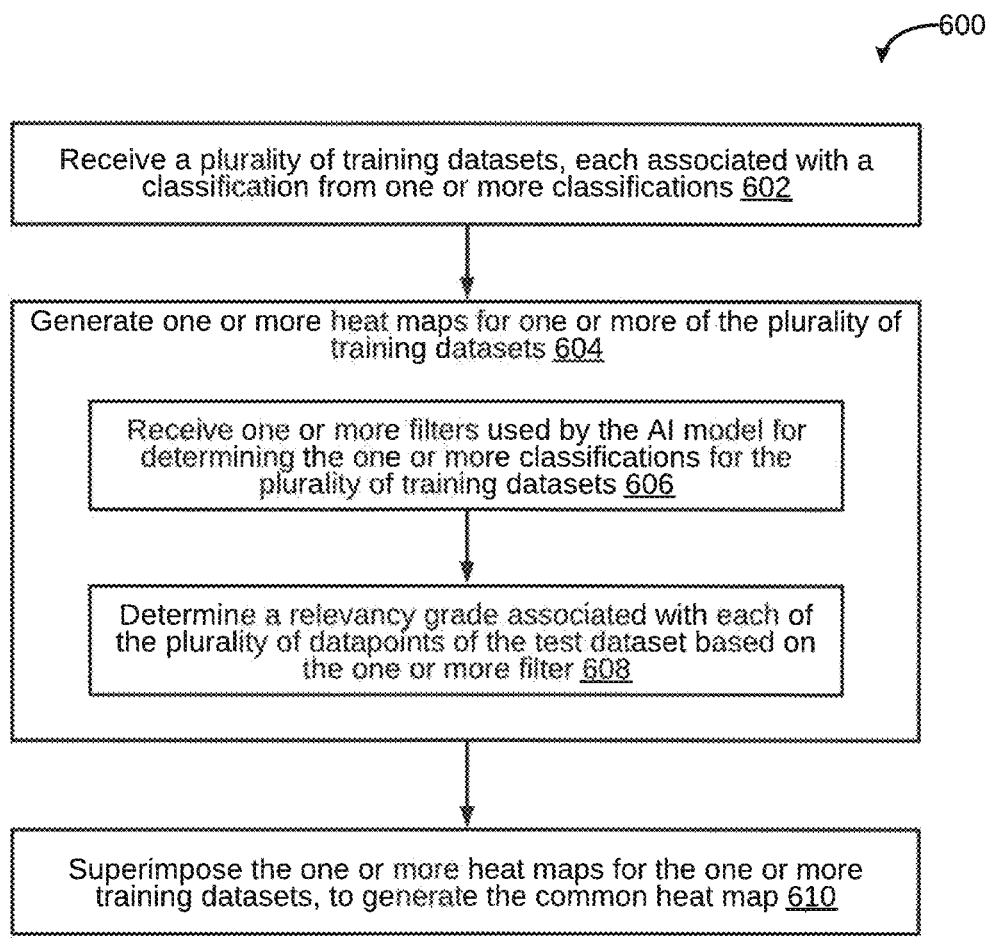
FIG. 6 illustrates a flowchart of a method of generating a common heat map, in accordance with an embodiment

Referring now to FIG. 6, a flowchart 600 of a method of generating a common heat map is illustrated, in accordance with an embodiment. At step 602, a plurality of training datasets are received. Each of the plurality of training datasets is associated with a classification from one or more classifications. At step 604, one or more heat maps for one or more of the plurality of training datasets are generated. At step 606, the one or more heat maps for the one or more training datasets are superimposed to generate the common heat map.

At step 602, the plurality of training datasets may be received. It may be noted that each of the plurality of training datasets may be associated with a classification from one or more classifications. As mentioned earlier, the training datasets may include image data. In some embodiments, image data may be ingested into the classifier model 202 for identifying the classification. The image data may be classified by the classifier model 202 into a specific classification among a set of available classifications. Further, activations may be generated from the image data.

At step 604, one or more heat maps may be generated for one or more of the plurality of training datasets (image data). In some embodiments, the one or more heat maps may be generated using Layer wise Relevance Propagation (LRP). By way of an example, to obtain relevance at any layer, a Softmax output of the classifier model may be projected back to the previous layer with intensities proportional to the weights. It may be continued until the input layer is reached. For the image input or the training data input, it indicates which part is more important in decision-making. In alternate embodiments, the one or more heat maps may be generated using Sensitivity Analysis (SA). In order to generate the SA based heat map, different parts of the image may be masked off systematically in an order starting from top left corner. The different parts may be processed until the bottom right. Each time, a pixel may be removed, and the impact (of removing the pixel) on the classification is noted.

In some embodiments, generating the one or more heat maps may further include receiving one or more filters used by the classifier model (AI model) for determining the one or more classifications for the plurality of training datasets at step 606. Further, at step 608, the relevancy grade associated with each of the plurality of datapoints of the test dataset may be determined based on the one or more filters.

At step 610, the one or more heat maps for the one or more training datasets are superimposed to generate the common heat map. In this step, relevance based heat maps of different classes are super-imposed to obtain the common heat map. It may be understood that the common heat map may indicate important regions in different classifications of the classifier model 202. It may be understood that the common heat map may be generated as a part of the AI model development i.e. a subset of training data. As it will be appreciated by those skilled in the art, AI or deep learning model development may require large training set. For example, 400 data points per classification may be used to obtain the common heat map, because different images may have different but closely related heat maps for the class. In some embodiments, spurious heat maps may be discarded. For example, among 400 images (training data), 360 images may play a role in decision making by the AI model, while 40 images may not be relevant for the decision making. In this case, these 40 images are spurious and may be discarded. The common heat map of a particular classification may also indicate possible postures or variants, which the classification can support. The common heat map may further eliminate spurious regions identified in the heat map.

At step 610, the common heat maps of different classifications may be superimposed. If a region falls in more than one heat map, the corresponding weightage may be increased (for example, the weightage is doubled). Similarly, if a region is found in three heat maps, the corresponding is tripled, and so on. In some embodiment, priorities may be assigned based on the frequency of occurrences or statistical significance of the images (for example, the digit, as discussed above). The output may be a single heat map for the classifier model. It may be noted that the common heat map may span a full image. It may be further noted that strength or importance of different regions may be distinct, as revealed by the common heat map. The generation of common heat map is further explained, by way of an example, in conjunction with FIG. 7.

Figure 7:
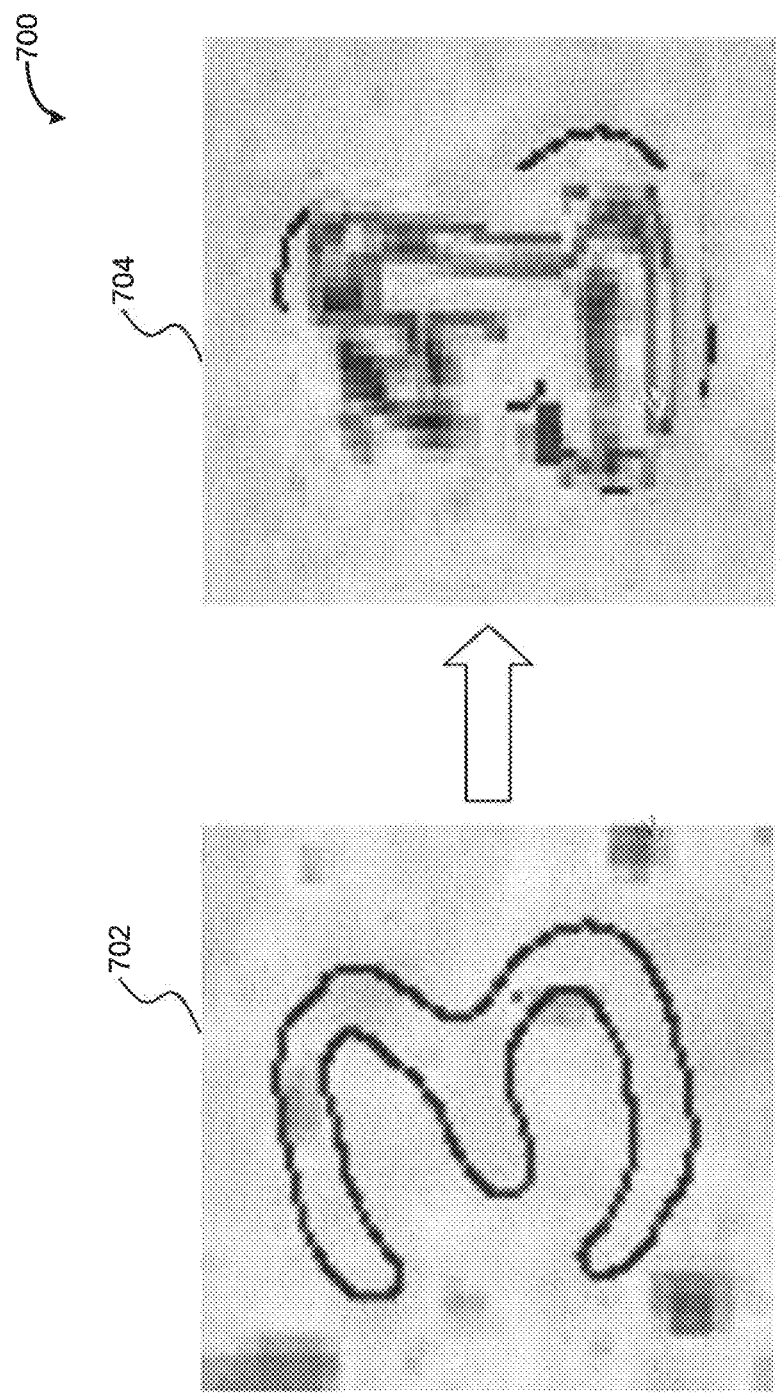
FIG. 7 illustrates a process of generation of a common heat map, in accordance with an exemplary embodiment.

Referring now to FIG. 7, a process 700 of generation of a common heat map is illustrated, in accordance with an embodiment. A heat map 702 is for a digit "3" relating to a classifier model of handwritten digits. A common heat map 704 may be generated by superimposing multiple heat maps similar to the heat map 702.

Returning back to FIG. 5, at step 504, a relevancy grade associated with each of a plurality of datapoints within a test dataset may be determined by comparing the test dataset with the common heat map. In some embodiments, determining the relevancy grade may further include receiving one or more filters used by the classifier model 202 (AI model) for determining the one or more classifications for the plurality of training datasets, and determining the relevancy grade associated with each of the plurality of datapoints of the test dataset based on the one or more filter. In some embodiments, a priority index may be assigned to each of a plurality of regions of the common heat map, based on relative importance of the respective region. Upon assigning the plurality index, the relevancy grade associated with each of a plurality of datapoints within a test dataset may be determined based on the priority index assigned to each of the plurality of regions of the common heat map. The different regions of the common heat map may be assigned with different priority indices to indicate relative importance in decision-making. The priority indices may be assigned based on the intensity of different regions of the common heat map. It may be noted that heat maps of different importance may be encrypted with different encryption keys, and also regions of a heat map may also be encrypted with different encryption keys of different strengths (explained in the subsequent sections), based on the priority indices assigned to the different regions of the heat map.

At step 506, an encryption level associated with each of the plurality of datapoints may be calculated, based on the relevancy grade. At step 508, at least one datapoint from the plurality of datapoints may be selectively encrypted, based on the encryption level associated with each of the plurality of datapoints. In some embodiments, input data and the common heat map may be received. Further, homomorphic encryption keys with different strengths for different regions of the image may be received from the data repository, as discussed above.

In some embodiments, selectively encrypting the at least one datapoint may include iteratively encrypting each of the at least one datapoint, at step 516. The number of iterations may be based on the relevancy grade associated with each of the at least one datapoint. In alternate embodiments, selectively encrypting the at least one datapoint may include selecting a homomorphic encryption key of a predetermined complexity for encrypting each of the at least one datapoint. Such an encryption of the datapoint may be based on the relevancy grade assigned to each of the at least one datapoint, at step 518. The selectively encrypting may further include encrypting each of the at least one datapoint using the associated selected homomorphic encryption key, at step 520. The data available in different regions of the image may be encrypted using different homomorphic encryption keys of different strengths, where the region which is more common among the set of classifications may be assigned with higher-strength homomorphic encryption key. In other words, the data may be encrypted based on the generated heat map intensities, and accordingly, data sent to the classifier model over the cloud may be encrypted with distinct keys and/or multiple levels of hierarchy. Each level within the hierarchy corresponds to the relative importance of data. The strength of the encryption for a certain region may be made proportional to the intensity of the heat map for that region. The intensity of a region may be determined based on a color scheme within the heat map. In an embodiment, when a specific section within a heat map has intensity above a predefined intensity value, that section may be assigned an encryption key of higher strength. Here, the homomorphic encryption keys may be used to encrypt the data.

In some embodiments, a level of importance of a heat map may be identified based on the LRP score. In such embodiments, a large number of input images may be used and the filters (for classifying each classification of objects) may be identified. Based on order of importance, for each filter, a level of importance may be attached with a heat map or a region within a heat map. For example, if the filter output is more important, as indicated by the heat map, it falls into the level of high importance. For each level of filter, a different set of encryption and decryption keys may be generated.

For encryption, a key may be used for each classification (output) from the classifier model. The overlapping regions may use multiple keys applied iteratively. For example, a region in an image contributing for two classes, may be encrypted two times or using a stronger key. Further, based on the generated common heat map, the regions with higher weightage or found in multiple classes may be encrypted with multiple classification keys. In an embodiment, the key strength may be increased proportional to intensity of the heat map. The heat map may be shared as part of the license file. As it will be appreciated, it would make it difficult for a hacker to know how many distinct keys are used and applied over which part of the data thus. As a result, such, the data better secured. The selective encryption of a test dataset is further explained in conjunction with FIG. 8.

Figure 8:
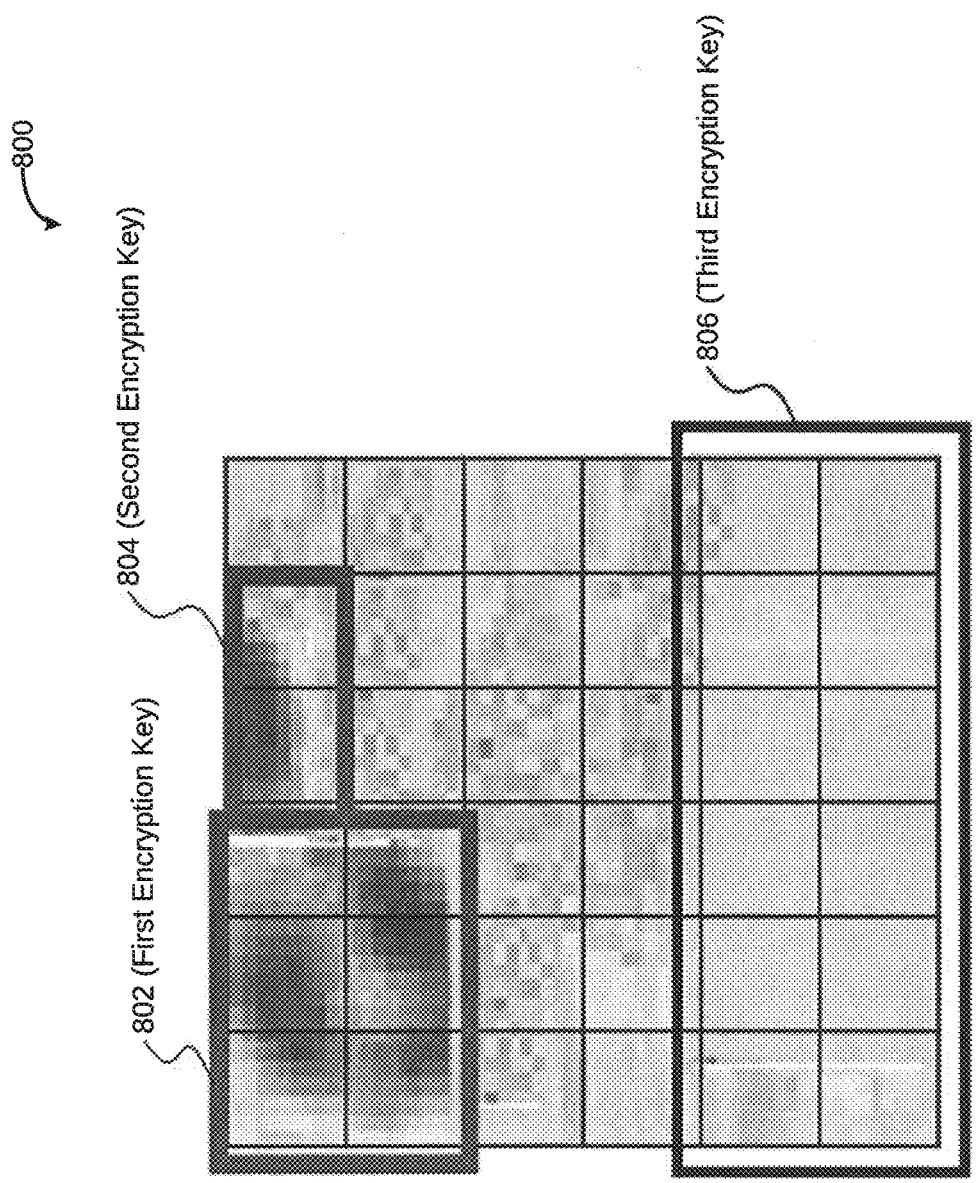
FIG. 8 illustrates an exemplary test dataset (an image), in accordance with an exemplary embodiment.

Referring now to FIG. 8, an exemplary test dataset (an image) 800 is illustrated, in accordance with an exemplary embodiment. Different regions of the image are encrypted with different keys, based on the common hat map. For example, region 802 may be encrypted with a first encryption key, a region 804 may be encrypted with a second encryption key, and a region 806 may be encrypted with a third encryption key. The strength of each these keys may be proportional to intensity of the common heat map for the respective regions. The intensity of a region, for example, may be determined based on a color scheme within the heat map. In other words, a priority index may be assigned to each regions within the common heat map, based on a relative importance of the respective region. This may be determined based on intensity of a region in the common heat map. Thereafter, based on the priority index assigned to each regions of the common heat map, a relevancy grade associated with each datapoint within a test dataset may be determined. Once the relevancy grade is determined, an encryption level associated with each of the datapoints is calculated. Thereafter, one or more datapoints may be selectively encrypted based on the encryption level associated with each datapoint. Accordingly, different homomorphic encryption keys with different strength may be selected.

Returning back to FIG. 5, at step 510, an encryption scale may be generated based on encrypted datapoints of the test dataset and unencrypted datapoints of the test dataset. In some embodiment, the encrypted data may be sent to the classifier model to identify the classification information, and then to an encryption scale generating module to generate the encryption scale. The encryption scale may be used factor for interpreting the heat map, and may indicate a ratio between the weights of the encrypted model and the non-encrypted model. The encryption scale may be generated based on normal and encrypted model weights. It may be noted that a range of encryption keys may be selected to maintain consistency in the relevance for the models with and without encrypted input.

As it will be appreciated, the encryption of the data may be required to assure that the same neurons are relevant (or activated) in the model when the input data is not encrypted. The encryption keys may be selected so that the relevance is proportional to relevance with non-encrypted data. Additionally, the heat maps with and without encryptions are proportional. This is necessary, as relevance is with respect to a ratio of weighted activation at neuron to total activation of the layer containing the neuron. This proportionality may be the scale that may be used for decoding. To obtain the encryption scale, at the time of model development, the heat map ratios of a test image spanning a major part of the image regions may be computed with and without encryption.

In some embodiments, in order to compute the encryption scale, prioritized regions from the common heat map may segregated. For example, in an image having four distinct priority regions, one of the region may be used to obtain the scale for that region. The intensities of each pixel in the region may be added and the same region may be subjected to encryption, thereby resulting in adding of the intensities of the heat map. The ratio of the two sums may provide the encryption scale. Further, when the filters or heat maps of different importance are encrypted using different encryption keys, the computation may require special care using multiple keys.

At step 512, an encrypted classification output may be decrypted based on the encryption scale to generate a decrypted classification output. The encrypted data may be decrypted using the homomorphic encryption keys. In some embodiments, the output of the model may be decrypted at the user end using a decrypting device. The decryption of the encrypted data is further explained in conjunction with FIG. 9.

Figure 9:
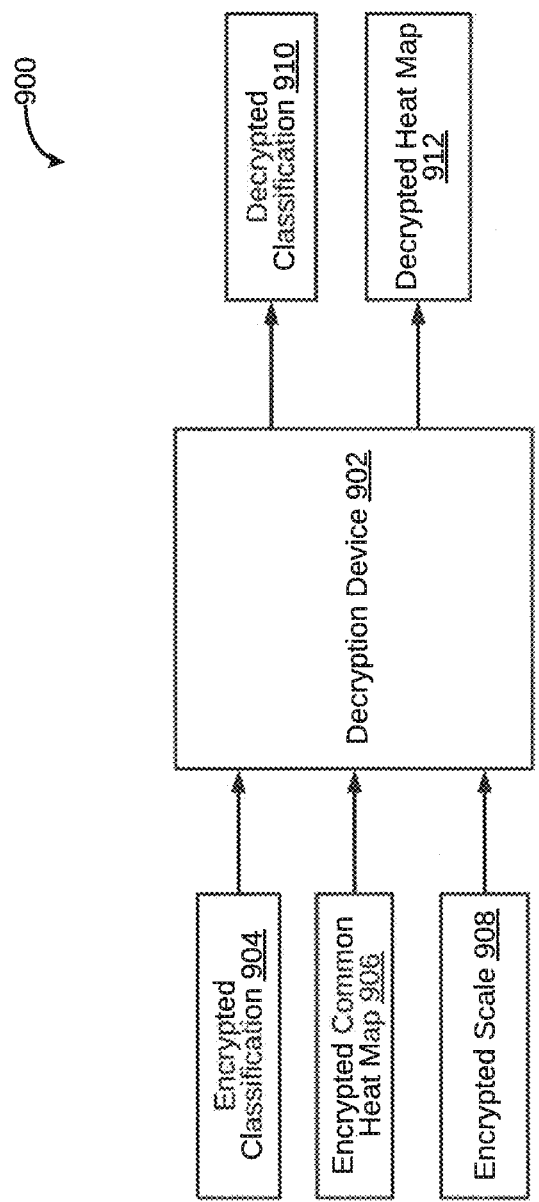
FIG. 9 illustrates a process of decrypting encrypted data, in accordance with an exemplary embodiment.

Referring now to FIG. 9, a process 900 of decrypting encrypted data is illustrated, in accordance with an exemplary embodiment. A decryption device 902 may decrypt the encrypted data using an encrypted classification 904 of the data (image), an encrypted common heat map 906, and an encryption scale 908. Further, the classification may be decrypted and the decrypted data may be scaled with the encryption scale. As such, the decryption device 902 may generate a decrypted classification 910 and a decrypted heat map 912.

Returning back to FIG. 5, at step 514, the decrypted classification output may be rendered to the user in response to the decryption. By way of an example, the decrypted classification and the decrypted heat map may be rendered to a user, for consumption. The heat map may be used to fine-tune the model further by linking it to the average heat map and the associated image.

As an example of the method described above, a user 'John' may want to send his salary slip to a classifier model hosted by a bank on the cloud in order to decide his borrowing limit for next month. The classifier model is trained to process the salary slip image and accordingly take decisions. In this case, John uses homomorphic encryption to send the data to the model. John invokes application implemented by the current invention and uses three different keys for encrypting the his data. For example, a first key for blank part of the image, a second key for random text, and a third key for the numbers in the image, in order of increasing priority. John then obtains the response from the model and uses homomorphic decryption to obtain the credit limit from the classification as classification B, where three different classifications A, B, and C are associated with different limits.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 10:
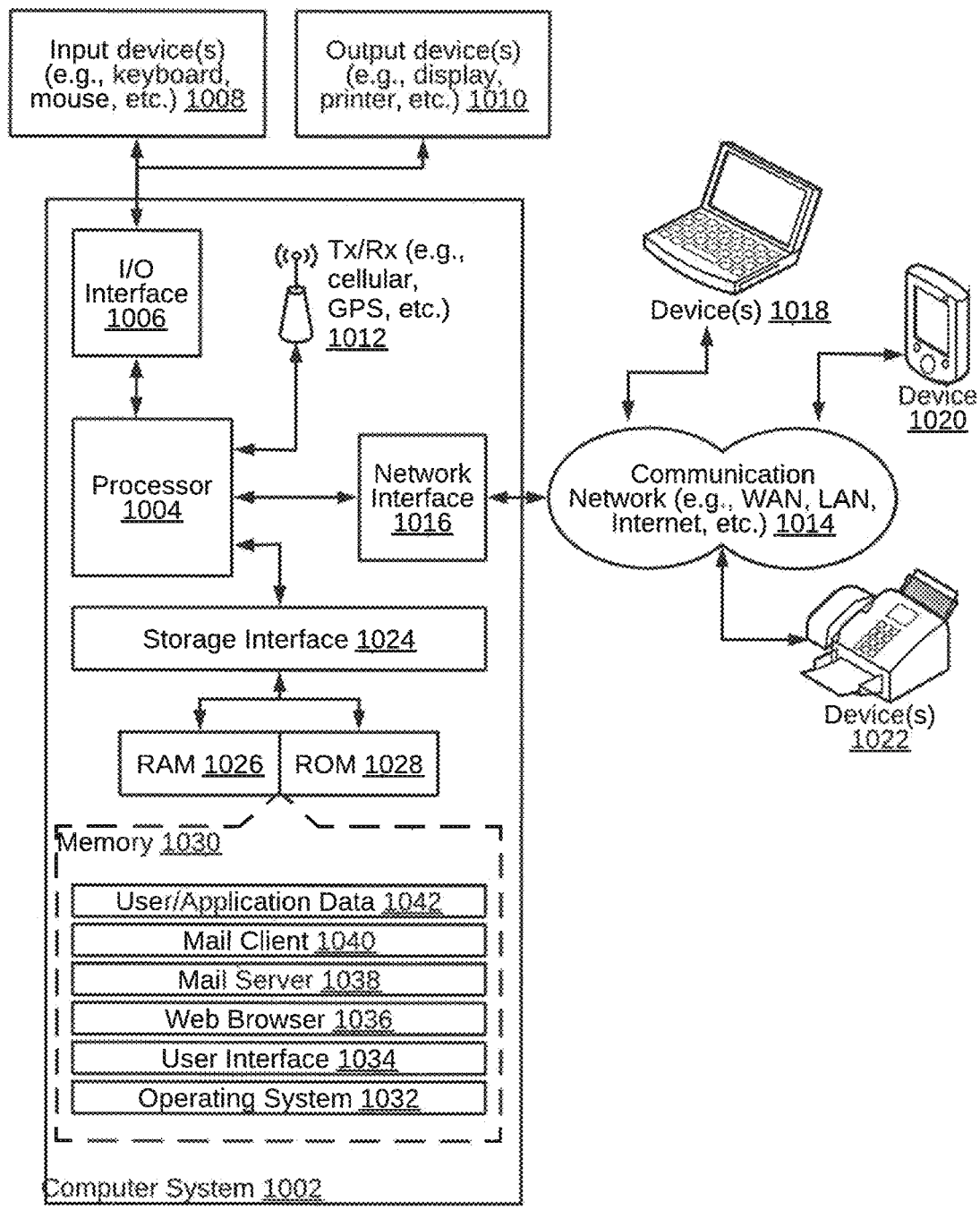
FIG. 10 illustrates a block diagram of an exemplary computer system for implementing various embodiments.

The disclosed methods and systems may be implemented on a conventional or a general-purpose computer system, such as a personal computer (PC) or server computer. Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc.

Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc.

In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or data repository components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like.

User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for generating a plurality heat maps corresponding to training dataset (for example, images) based on relevance of neurons and input pixels and taking average of the generated heat maps over multiple classes by assigning weightages proportional to degree of overlap, and categorizing different regions of the heat map based on their level of importance/relevance in decision making. The techniques further provide for encrypting data available in different regions of the image with different homomorphic encryption keys of different strengths, for example, the region which is more common among the set of classifications is assigned with higher-strength homomorphic encryption key. The techniques further provide for generating a scale factor for interpreting the heat map, which indicates a ratio between the weights of the encrypted model and the non-encrypted model. Further, the techniques provide for decrypting the encrypted data using the homomorphic encryption keys.

As will be appreciated by those skilled in the art, the above techniques pertain to selective encryption of a test dataset. The proposed techniques provide for encrypting data using different keys of different strength, where the key strength is proportional to relevance of the part of the data for the classification (obtained from a classifier model). Accordingly, less relevant parts may be encrypted with keys of lesser strength, while more relevant parts may be encrypted with keys of higher strength. This makes difficult for a hacker to hack into the data, as the hacker shall not know which key is used for which part even if the hacker obtains all the keys. The proposed techniques provide additional security by assigning multiple keys to different parts of the data based on degree of relevance (in decision-making). The proposed techniques may be used to reduce computations as the strength of the encryption is reduced for the non-contributing data. As a result, the system becomes fast and capable of near real time decisions. Moreover, stronger keys can be used without increase in system complexity or turnaround time for decision making. Overall, the deep learning model and data applied over the deep learning model are implemented with high security, and reduced computational complexity, power, and processing delays. Further, the proposed techniques provide for protecting the deep learning model apart from the data.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of selective encryption of a test dataset, the method comprising:
   determining, by an encrypting device, a relevancy grade associated with each of a plurality of datapoints within a test dataset by comparing the test dataset with a common heat map, wherein the common heat map is generated using a plurality of training datasets;
   assigning a priority index to each of a plurality of regions of the common heat map, based on relative importance of each of the plurality of regions, wherein the relative importance of each of the plurality of regions is based on a color scheme within the common heat map;
   determining the relevancy grade associated with each of the plurality of datapoints within a test dataset based on the priority index assigned to each of the plurality of regions of the common heat map;
   calculating, by the encrypting device, based on the relevancy grade, an encryption level associated with each of the plurality of datapoints; and
   selectively encrypting, by the encrypting device, at least one datapoint from the plurality of datapoints based on the encryption level associated with each of the plurality of datapoints, wherein selectively encrypting the at least one datapoint comprises:
   iteratively encrypting each of the at least one datapoint, wherein a number of iterations is based on the relevancy grade associated with each of the at least one datapoint, wherein different regions of each of the plurality of datapoints within the test dataset are encrypted with different keys, based on the common heat map,
   wherein the at least one data point is rendered to a user after being decrypted.

2. The method of claim 1, wherein generating the common heat map comprises:
   receiving the plurality of training datasets, each associated with a classification from one or more classifications, wherein the one or more classifications are determined by an Artificial Intelligence (AI) model;
   generating one or more heat maps for one or more of the plurality of training datasets, wherein each of the one or more heat maps indicates a relevancy grade associated with each datapoint of each of the one or more training datasets; and
   superimposing the one or more heat maps for the one or more training datasets, to generate the common heat map.

3. The method of claim 2, wherein the one or more heat maps are generated using at least one of a Layer wise Relevance Propagation (LRP) and Sensitivity Analysis (SA).

4. The method of claim 1, wherein determining the relevancy grade further comprises:

receiving one or more filters used by the AI model for determining the one or more classifications for the plurality of training datasets; and determining a relevancy grade associated with each of the plurality of datapoints of the test dataset based on the one or more filter.

5. The method of claim 1, wherein selectively encrypting the at least one datapoint comprises:

selecting a homomorphic encryption key of a predetermined complexity for encrypting each of the at least one datapoint based on the relevancy grade assigned to each of the at least one datapoint; and encrypting each of the at least one datapoint using the associated selected homomorphic encryption key.

6. The method of claim 1, wherein one or more of the test dataset and the training dataset is one of an image dataset, a video dataset, and a text dataset.

7. The method of claim 1 further comprising generating an encryption scale based on encrypted datapoints of the test dataset and unencrypted datapoints of the test dataset.

8. The method of claim 7 further comprising:

decrypting an encrypted classification output based on the encryption scale to generate a decrypted classification output; and rendering the decrypted classification output to the user in response to the decryption, wherein the decrypted classification output comprises the at least one datapoint.

9. An encryption device for selective encryption of a test dataset, the encryption device comprising:

a processor: and a memory communicatively coupled to the processor, wherein the memory stores processor instructions, which, on execution, causes the processor to:

determine a relevancy grade associated with each of a plurality of datapoints within a test dataset by comparing the test dataset with a common heat map, wherein the common heat map is generated using a plurality of training datasets;

assign a priority index to each of a plurality of regions of the common het map, based on relative importance of each of the plurality of regions, wherein the relative importance of each of the plurality of regions is based on a color scheme within common the heat map;

determine the relevancy grade associated with each of the plurality of datapoints within a test dataset based on the priority index assigned to each of the plurality of regions of the common heat map;

calculate based on the relevancy grade, an encryption level associated with each of the plurality of datapoints; and selectively encrypt at least one datapoint from the plurality of datapoints based on the encryption level associated with each of the plurality of datapoints, wherein selectively encrypting the at least one datapoint comprises:

iteratively encrypting each of the at least one datapoint, wherein a number of iterations is based on the relevancy grade associated with each of the at least one datapoint, wherein different regions of each of the plurality of datapoints within the test dataset are encrypted with different keys, based on the common heat map, wherein the at least one data point is rendered to a user after being decrypted.

10. The encryption device of claim 9, wherein generating the common heat map comprises:

receiving the plurality of training datasets, each associated with a classification from one or more classifications, wherein the one or more classifications are determined by an Artificial Intelligence (AI) model;

generating one or more heat maps for one or more of the plurality of training datasets, wherein each of the one or more heat maps indicates a relevancy grade associated with each datapoint of each of the one or more training datasets; and superimposing the one or more heat maps for the one or more training datasets, to generate the common heat map.

11. The encryption device of claim 10, wherein the one or more heat maps are generated using at least one of a Layer wise Relevance Propagation (LRP) and Sensitivity Analysis (SA).

12. The encryption device of claim 9, wherein determining the relevancy grade further comprises:

receiving one or more filters used by the AI model for determining the one or more classifications for the plurality of training datasets; and determining a relevancy grade associated with each of the plurality of datapoints of the test dataset based on the one or more filter.

13. The encryption device of claim 9, wherein selectively encrypting the at least one datapoint comprises, at least one of:

selecting a homomorphic encryption key of a predetermined complexity for encrypting each of the at least one datapoint based on the relevancy grade assigned to each of the at least one datapoint; and encrypting each of the at least one datapoint using the associated selected homomorphic encryption key.

14. The encryption device of claim 9, wherein one or more of the test dataset and the training dataset is one of an image dataset, a video dataset, and a text dataset.

15. The encryption device of claim 9, wherein the processor instructions further cause the processor to:

generate an encryption scale based on encrypted datapoints of the test dataset and unencrypted datapoints of the test dataset.

16. The encryption device of claim 9, wherein the processor instructions further cause the processor to:

decrypt an encrypted classification output based on the encryption scale to generate a decrypted classification output; and render the decrypted classification output to the user in response to the decryption, wherein the decrypted classification output comprises the at least one datapoint.

17. A non-transitory computer-readable storage medium having stored thereon, a set of computer-executable instructions causing a computer comprising one or more processors to perform steps comprising:

determining a relevancy grade associated with each of a plurality of datapoints within a test dataset by comparing the test dataset with a common heat map, wherein the common heat map is generated using a plurality of training datasets;

assigning a priority index to each of a plurality of regions of the common het map, based on relative importance of each of the plurality of regions, wherein the relative importance of each of the plurality of regions is based on a color scheme within the common heat map;

determining the relevancy grade associated with each of the plurality of datapoints within a test dataset based on the priority index assigned to each of the plurality of regions of the common heat map;

calculating based on the relevancy grade, an encryption level associated with each of the plurality of datapoints; and
selectively encrypting at least one datapoint from the plurality of datapoints based on the encryption level associated with each of the plurality of datapoints, wherein selectively encrypting the at least one datapoint comprises:
iteratively encrypting each of the at least one datapoint, wherein a number of iterations is based on the relevancy grade associated with each of the at least one datapoint, wherein different regions of each of the plurality of datapoints within the test dataset are encrypted with different keys, based on the common heat map,
wherein the at least one data point is rendered to a user after being decrypted.

* * * * *